H. A. OWEN.
DEFERRED ACTION INDICATING DEVICE FOR LOOMS.
APPLICATION FILED FEB. 18, 1915.

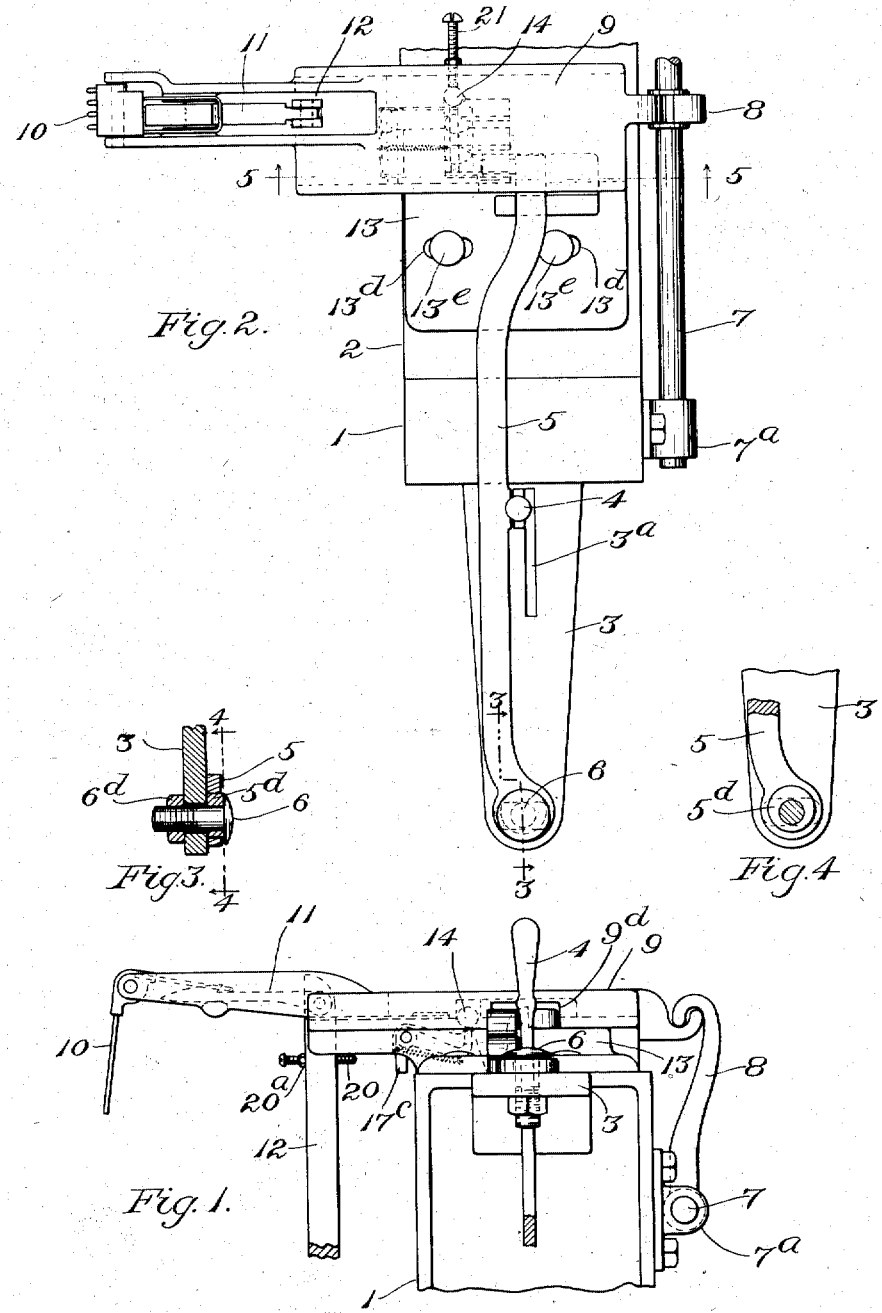

1,240,592.

Patented Sept. 18, 1917.
5 SHEETS—SHEET 2.

Witnesses
Ivan O. Blake.
Ellen O. Spring

Inventor
Henry A. Owen

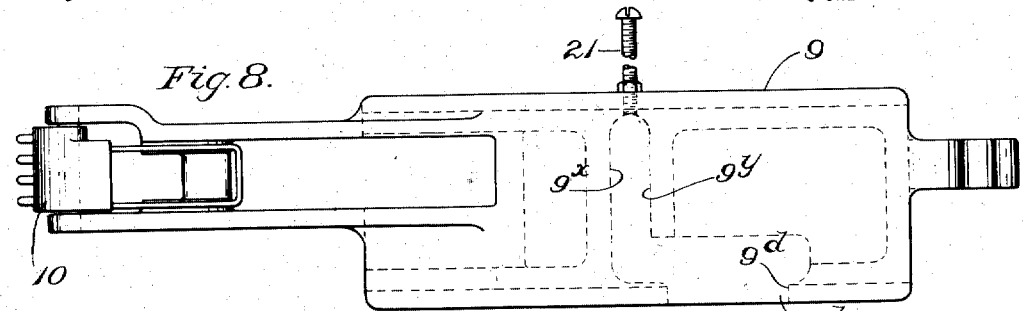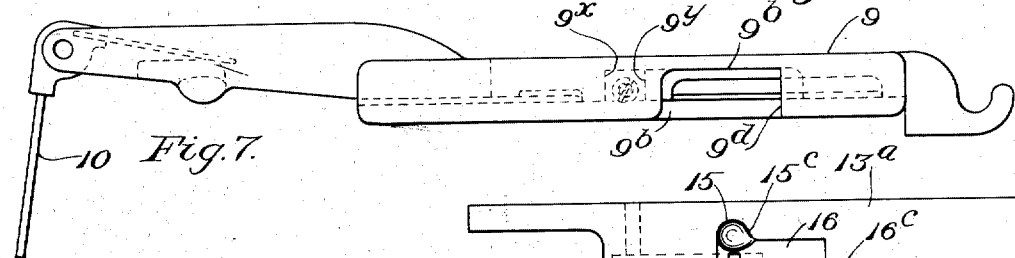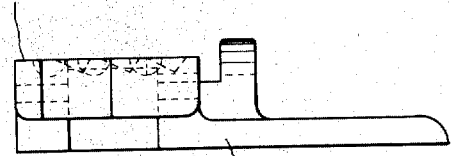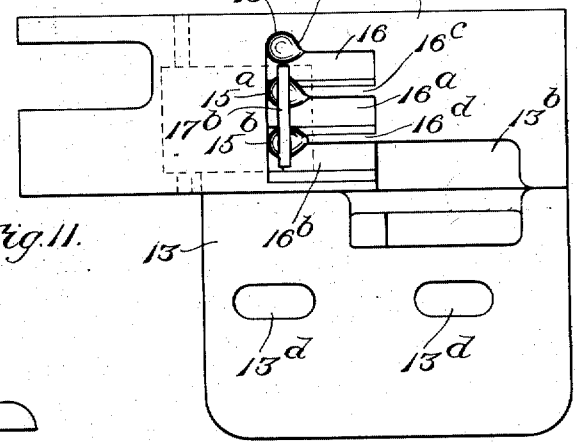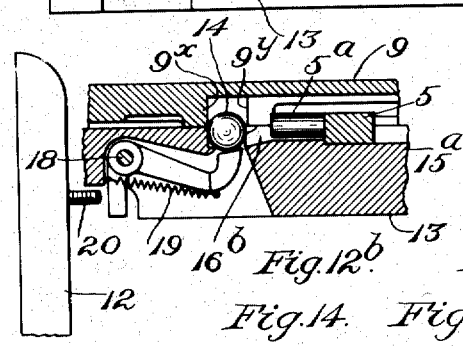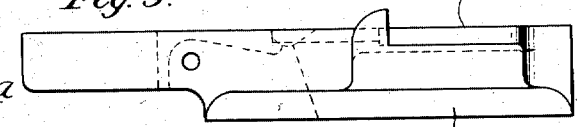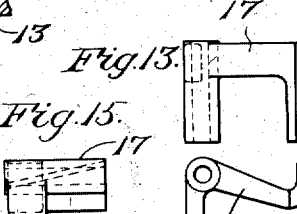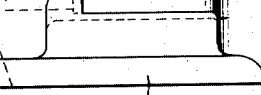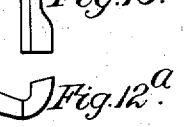

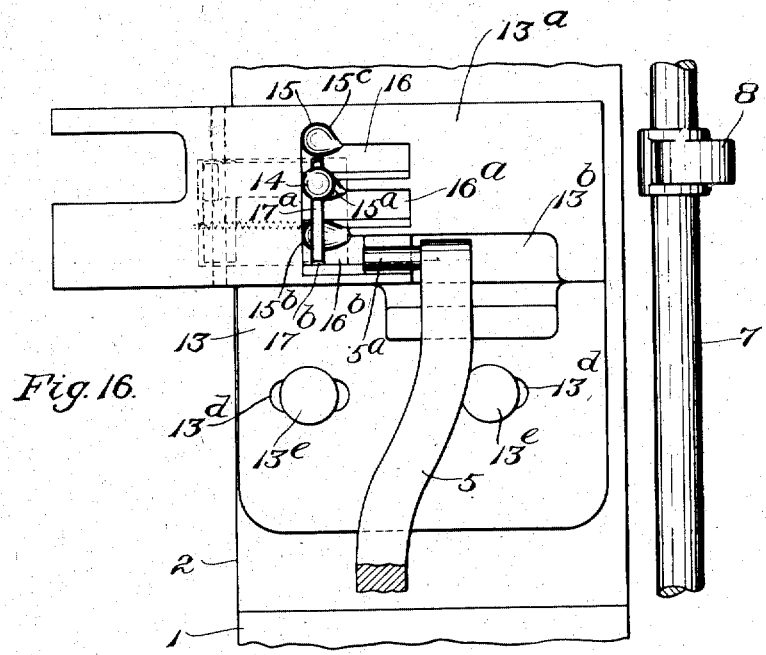
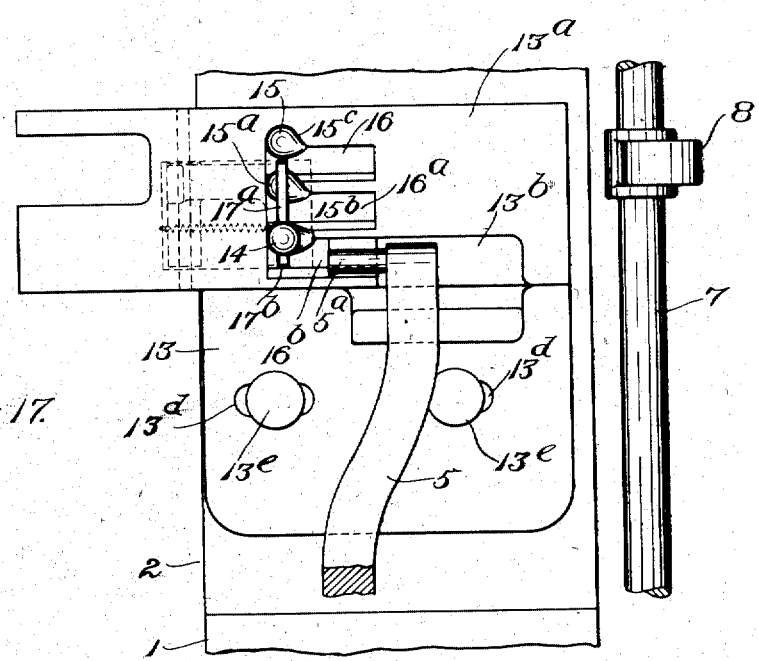

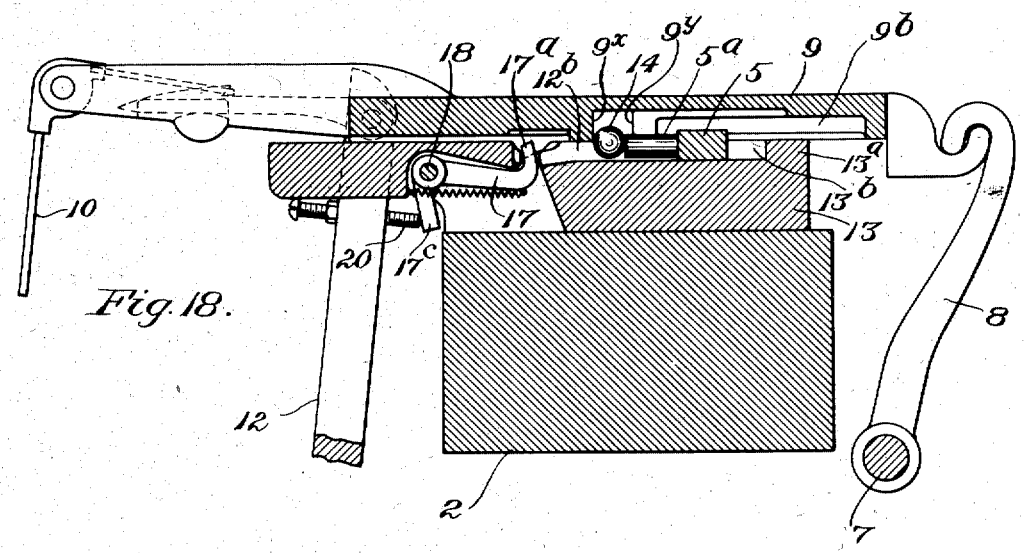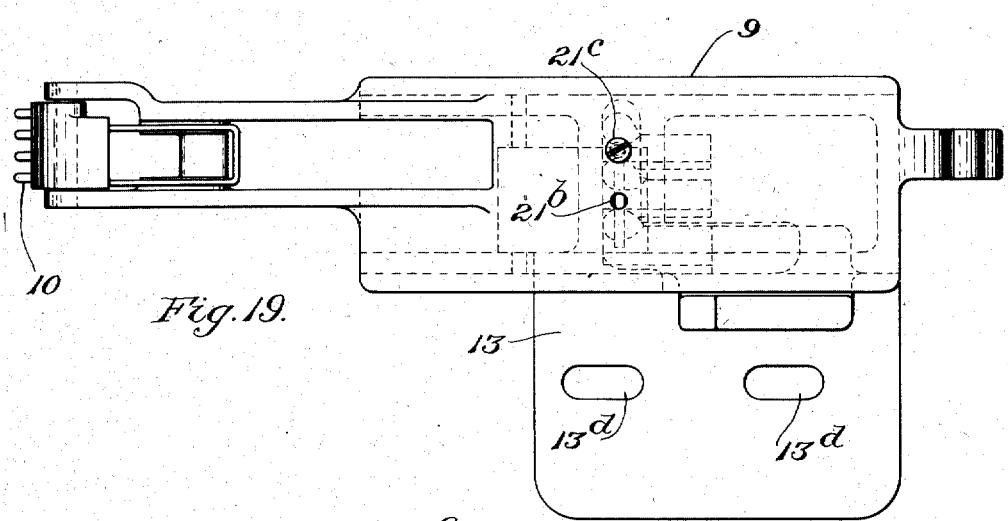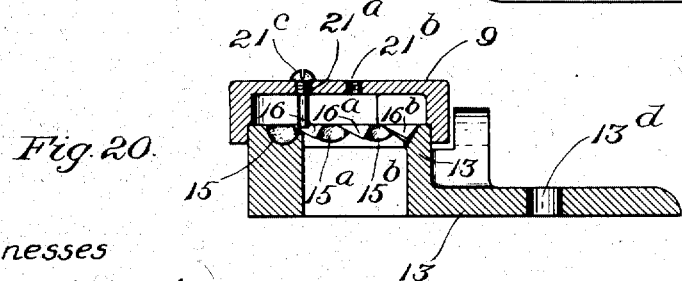

UNITED STATES PATENT OFFICE.

HENRY A. OWEN, OF WHITINSVILLE, MASSACHUSETTS, ASSIGNOR TO WHITIN MACHINE WORKS, OF WHITINSVILLE, MASSACHUSETTS, A CORPORATION OF MASSACHUSETTS.

DEFERRED-ACTION INDICATING DEVICE FOR LOOMS.

1,240,592. Specification of Letters Patent. Patented Sept. 18, 1917.

Application filed February 18, 1915. Serial No. 9,008.

*To all whom it may concern:*

Be it known that I, HENRY A. OWEN, a citizen of the United States, residing at Whitinsville, in the county of Worcester, State of Massachusetts, have invented a certain new and useful Improvement in Deferred-Action Indicating Devices for Looms, of which the following is a specification, reference being had therein to the accompanying drawings.

The invention comprises deferred-action indicating devices, and is designed more particularly for employment in looms, although I contemplate also its employment in other machines to which it is adaptable and in which its functions are desired to be performed. Devices embodying the invention act as a counter to count off a sequence of occurrences of a given action, and serve to indicate the completion of the predetermined sequence. They are utilized, ordinarily, to bring about a change in the working of the machine in which they are employed. They may be combined with the weft-detector devices of a loom to bring about a change in the working of the loom when the predetermined action of the weft-detector devices takes place a predetermined number of times in immediate succession. Thus, they may be employed to bring about the stoppage of an automatic weft-replenishing loom when the weft-detector devices of the latter act a given number of times in such succession. Or they may be employed to defer the calling or indicating of replenishing instrumentalities into action until after the devices that are used to detect substantial exhaustion of the working supply of weft or filling have acted a predetermined number of times after the said supply has become exhausted to the predetermined extent. They may be employed in various ways and in various combinations for the purpose of facilitating the finding of the proper shed in the operation that usually is termed pick-finding.

The drawings show a convenient illustrative embodiment of the principles of the invention, operatively combined with loom weft-fork devices, and arranged to perform its deferred indicating action by communicating movement to a swinging arm or lever that may be utilized to bring about the unshipping of a loom through such movement.

Briefly stated, the said embodiment is of the class of devices in which an actuating member or dog is combined with the weft-fork slide so as to derive movements from those of the said slide, and means is provided for producing through the movements of the slide and actuating member or dog a shift of the said member or dog so that after making one or more preliminary counting strokes it shall assume a relative position in which its stroke becomes effective for indicating purposes, provision also being made for effecting automatically the return of the actuating-member or dog to its normal or starting position. Briefly stated, the invention consists essentially in deferred-action indicating devices having a traveling actuator or dog, combined with guiding means having a plurality of paths by which the said actuator or dog is conducted by one or more stages from its starting position into a path in which, by its movement, it produces the prearranged indicating action.

In the drawings,—

Figure 1 is an end elevation of certain portions of a loom with the said illustrative embodiment of the invention combined therewith.

Fig. 2 is a plan view of the parts that are represented in Fig. 1.

Fig. 3 is a detail view on an enlarged scale mainly in section on the line 3—3 of Fig. 2.

Fig. 4 is a plan view of the parts that are shown in Fig. 3, but in section on the line 4—4 of Fig. 3.

Figure 6:
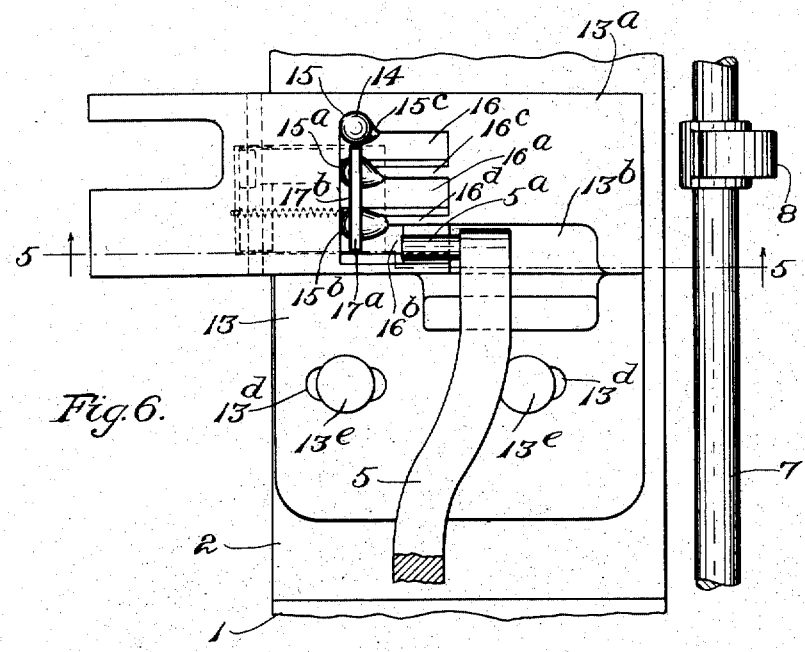
Figure 5:
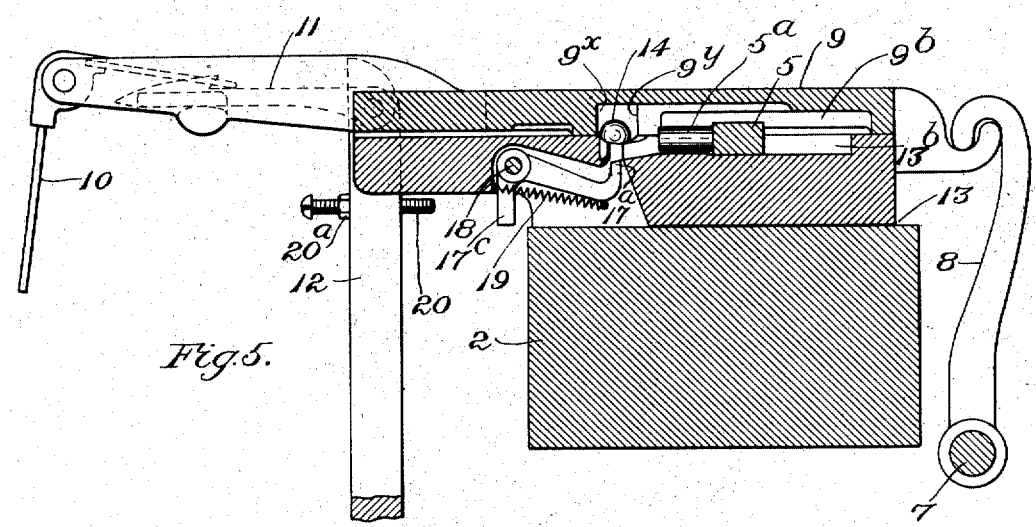

Fig. 5, Sheet 2, is a side view on an enlarged scale, with certain parts in section on approximately the line 5—5 of Figs. 2 and 6.

Fig. 6 is a plan view showing certain of the parts of Figs. 1, 2 and 5, but with the weft-fork, fork-slide, and weft-hammer omitted.

Fig. 7, Sheet 3, is a side elevation of the weft-fork and weft-fork slide.

Fig. 8 is a plan view thereof.

Fig. 9 is a side elevation of the base or stand on which the weft-fork slide is mounted, Fig. 10 is a rear elevation thereof, and Fig. 11 is a plan view thereof.

Fig. 12 is a side elevation of the replacer for the actuator or dog, showing the latter detached. Fig. 13 is a plan view thereof.

Figs. 12ª and 13ª are, respectively, a side elevation and a plan of a slightly modified replacer. Fig. 12ᵇ is a partly sectional view of the devices, showing the modified replacer in its working relations. Figs. 14 and 15 are respectively a front elevation and a rear elevation of the replacer.

Figs. 16 and 17, Sheet 4, are partial plan views, and Fig. 18, Sheet 5, is a side view partly in section, showing the operation.

Fig. 19, Sheet 5, is a plan view of a modification.

Fig. 20, Sheet 5, is a cross-section of Fig. 19.

Having reference to the drawings,—

Portions of one end-frame of a loom are represented at 1 in Figs. 1, 2, 6, etc., portions of the breast-beam being shown at 2 in Figs. 2, 5, 6, etc. At 3, Figs. 1 and 2, is shown the usual bracket, mounted on the said end-frame, extending outward therefrom, and having the slot 3ª (Fig. 2) in which the shipper-handle 4 works. 5 is the knocking-off lever for the shipper-handle, the said lever swinging around a pivotal stud 6, Sheet 1, applied to the outer portion of the bracket 3. At 9 is a weft-fork slide having mounted pivotally upon its rearwardly-projecting extension a weft-fork 10. A weft-hammer hook 11 is shown connected with a weft-hammer 12, of which only the upper end is shown, the said weft-fork and weft-hammer being arranged to operate in the customary manner in the working of a loom. The weft-fork slide 9 is mounted upon a raised portion 13ª of a base or stand 13, shown separately in Figs. 9, 10 and 11, Sheet 3, and is fitted to such raised portion with capacity to slide thereon in the direction from front to rear. It is furnished with opposite marginal flanges which embrace the opposite sides of the said raised portion 13ª, so that thereby the slide is positioned properly upon the base or stand and guided in its movements forwardly and backwardly in the loom.

Referring, now, to the parts embodying the principles of the invention:—

The actuating member or dog is in the form of a ball 14, Figs. 1, 2, etc. It works upon the top of the raised portion 13ª (Figs. 9, 10 and 11 of Sheet 3, and Figs. 16, 17, 18 of Sheets 4 and 5) of the base or stand 13. A series of shallow pockets 15, 15ª, 15ᵇ, (Fig. 6 of Sheet 2, Fig. 11 of Sheet 3, and Figs. 16 and 17 of Sheet 4,) adapted to be occupied by the lower portion of the ball 14 in different positions of the latter, is formed in the said top. Path-grooves 16, 16ª, and 16ᵇ, extending in the direction from front to rear, communicating at their rear ends with the said pockets, and adapted for the travel of the ball therein, are formed in the said top, also. Ribs 16ᶜ and 16ᵈ intervene between the respective path-grooves.

The grooves 16, 16ª, extend forward from between the three pockets, and alternate with the latter. The groove 16ᵇ extends forward from the outer side of the pocket 15ᵇ.

In order that the weft-fork slide 9 in its movements forward and rearward may actuate the ball 14, the said slide is grooved transversely at its under side, as shown in Figs. 7 and 8, Sheet 3, in dotted lines, and in full lines in Fig. 5, Sheet 2, etc., to provide transverse walls 9ˣ, 9ʸ. The portion of the ball that projects above the top of the raised portion 13ª of the base or stand 13 enters between the said walls. When the weft-fork slide 9 is at rest in its normal rearward position, as in Figs. 2 and 5, the transverse groove registers with the series of pockets, and the ball occupies one of the pockets. When the slide moves forward from said normal position, the rear wall, 9ˣ, of the slide pushes the ball from its seat in such pocket, and into and along a path-groove with which such pocket communicates; when the slide moves rearward again, the front wall, 9ʸ, pushes the ball rearward within such groove and into the pocket into which the groove leads.

To direct the ball into the groove 16 when it is pushed forward out of pocket 15 by wall 9ˣ in a forward movement of slide 9, the front wall 15ᶜ of the said pocket, see Figs. 6, 16, 17, is inclined laterally toward the said groove as well as forwardly. To cause the ball to work close alongside the rib 16ᶜ when occupying groove 16, the said groove is made deepest next the said rib, as shown in Fig. 20, Sheet 5. At the rear end of groove 16 its deepest portion communicates with the pocket 15ª, so that the ball when pushed rearward within such groove by wall 9ʸ in the ensuing rearward movement of the slide, passes readily from the said groove into the latter pocket. The front wall of the pocket 15ª at the rear end of the rib 16ᶜ between the grooves 16 and 16ª is inclined in the same direction, namely laterally toward groove 16ª, as well as forwardly, in order to deflect the ball into groove 16ª when pushed forward from pocket 15ª. The greatest depth of groove 16ª is close alongside rib 16ᵈ, and communicates with pocket 15ᵇ so that the ball when moving rearwardly in such groove passes readily into such pocket. The front wall of the pocket 15ᵇ at the rear end of the rib 16ᵈ between the grooves 16ª and 16ᵇ is inclined similarly, namely laterally as well as forwardly, in order to deflect the ball into groove 16ᵇ when pushed forward from the pocket 15ᵇ.

It will be perceived that the construction thus far described is such that by successive forward and rearward movements of the weft-fork slide the ball will be switched from one pocket to another, in addition to being given a forward and rearward traveling movement.

The traveling movements of the ball, and the switching action, are utilized for counting and indicating purposes, as follows:—

When all three pockets 15, 15ª, and 15ᵇ are being utilized, the normal position of the ball 14 is in the pocket 15, as shown in Fig. 6, Sheet 2. It remains therein as long as the weft-fork slide 9 occupies its normal position at the rear. In case of weft-failure and consequent engagement of the hook of the weft-hammer with the tail of the weft-fork, the resulting movement of the weft-fork slide forward causes the rear wall, 9ˣ, of the said slide to push the ball forward from the said pocket 15 into and along the path-groove 16. As the weft-fork slide moves rearward again, the front wall, 9ʸ, pushes the ball rearward along the groove 16 until the ball lands in the pocket 15ª as shown in Fig. 16, Sheet 4. If, following a pick of the shuttle back to the opposite side of the loom, and a return pick from the latter side, the weft is still absent and the weft-hammer again engages with the tail of the weft-fork and moves the weft-fork slide forward a second time, the ball is moved forward within the groove 16ª, into which it is deflected by the laterally inclined front wall of pocket 15ª, and in the following return rearward movement of the slide the ball is carried rearward within the groove 16ª and landed in the pocket 15ᵇ, as in Fig. 17. If the weft is still absent following another pick across the loom and a return pick, the third forward movement of the weft-fork slide causes the ball to be deflected by the laterally inclined front wall of the pocket 15ᵇ into the groove 16ᵇ, so that the ball travels forward within the said groove 16ᵇ, as in Fig. 18, Sheet 5. This forward movement of the ball within the third groove, 16ᵇ, is utilized to actuate the arm or lever 5, as represented in Fig. 18.

In order that the arm or lever 5 may be actuated by the third successive forward movement of the ball, the free extremity of such arm or lever is entered between the top of the raised portion 13ª of the base or stand 13 and the under side of the weft-fork slide 9, the said parts being cut away at 13ᵇ and 9ᵇ, respectively, Figs. 5, 6 and 16, 17, 18, to accommodate the said end of the arm or lever, and such end is furnished with a pin or projection 5ª occupying the forward portion of the groove 16ᵇ. When the ball is caused to move forward within the said groove 16ᵇ through the action of the weft-fork slide, it is carried against the rear end of the said pin or projection as in Fig. 18 so as to push the arm or lever 5 forward and thereby dislodge the shipper-handle.

The described action involves a predetermined number of preliminary or switching strokes of the ball until the latter has been given a position in which it is adapted to make its indicating stroke, such indicating stroke operating, in the case of the illustrated embodiment, through the arm or lever 5 to dislodge the shipper-handle 4 and thereby bring about the stoppage of the loom.

The pocket 15ᵇ is not important, and I sometimes dispense therewith by omitting the same and causing the ball to discharge from the rear end of the groove 16ª into the rear end of the groove 16ᵇ.

The first rearward movement of the weft-fork slide 9 following the indicating (in this instance knocking-off) action will return the ball 14 to the rear end of the groove 16ᵇ, through the engagement of the shoulder 9ᵈ, Figs. 1 and 7, on the said slide at the front of the recess 9ᵇ with the free extremity of the knocking-off arm or lever 5, in case the ball has not previously returned to the said rear end. In the said rearward movement of the said slide 9 the said shoulder acts against the knocking-off arm or lever to carry the latter rearward with the slide, and in this movement of the arm or lever its pin 5ª will push the ball rearward within the groove 16ᵇ, if the ball has not already returned. The rearward movement of the arm or lever and the said pin occasioned by that of the slide 9 is limited in extent in the illustrated embodiment, because in the said embodiment the said pin must not assume a position in which its rear end will interfere with the required extent of forward movement of the slide 9 when the ball is elsewhere. Consequently in the said embodiment clearance must exist between the wall 9ˣ of the slide 9 and the rear end of the pin, in the rearmost position of the said pin, when the ball is elsewhere. This clearance is secured by thus limiting the extent of the rearward movement of the arm or lever 5. In some cases I contemplate making a hole in the wall 9ˣ in line with the rear end of the groove 16ᵇ, smaller than the ball, and also making the pin 5ª of a reduced size to enter the said hole when the ball is out of the way and the weft-fork slide 9 is moved all the way forward through the engagement of the weft-hammer hook with the tail of the weft-fork. When this construction is adopted, the arm or lever 5 and its pin 5ª may be moved farther to the rear than in the case of the illustrated construction, so as to push the ball back close to the rear end of the groove 16ᵇ.

Since in the illustrated construction the said rearward movement of the arm or lever and pin is not sufficient in extent to push the ball positively to the rear end of the groove 16ᵇ, I form the rear portion of the bottom of the said groove with a downward incline toward the rear, as shown in Figs. 5, 12ᵇ and 18, so that after being pushed part way back by the arm and pin the ball will roll the remainder of the way to the rear end of the groove by gravity, and will have no tendency to roll forward again of itself.

The return of the ball to the rear end of the groove 16$^b$ will be effected by the rearward movement that is imparted to the knocking-off arm or lever 5 by the shipper-handle 4 when the shipper-handle is lodged in its retaining notch at the time of restarting the loom, in case the said return has not already occurred.

The ball 14 is re-set or replaced automatically in its starting position, usually in the pocket 15. In this instance I employ a resetter or replacer 17, shown separately in detail views upon Sheet 3 of the drawings, which at the proper time lifts the ball above the pockets and rear ends of the grooves and returns it transversely across them to the said position. This resetter or replacer 17 is constituted by a rocking piece that is mounted pivotally in a recess at the under side of the base or stand 13, upon a pin 18. The forward portion 17$^a$ of the said rocking piece is the acting end of the resetter or replacer. The said acting end is upturned, and works in a slot 17$^b$, Figs. 6, 11, and 16, in the said base or stand, the said slot extending transversely across the intermediate portion of the width of the raised portion 13$^a$ of the base or stand, and intersecting the pockets 15$^a$, 15$^b$, and the rear portions of the three grooves 16, 16$^a$, 16$^b$. The acting end of the resetter or replacer is of corresponding breadth. In the normal position of the resetter or replacer the said acting end is retracted downward within or below the slot 17$^b$. In this instance, a contracting spiral spring 19, engaged with the resetter or replacer, acts with a tendency to hold the latter in the said normal retracted position, and returns it to such position after having been moved therefrom. The spring may be dispensed with in practice and gravity alone utilized to return the resetter or replacer to its normal retracted position and keep it there.

Suitable provision is made for actuating the resetter or replacer in the proper time-relations, to cause it to effect the replacing of the ball in starting position when such replacement is proper. In this embodiment, the resetter or replacer is furnished with a downturned tail-portion 17$^c$, and the weft-hammer 12 is furnished with a projection 20 to engage with the said tail-portion. This projection is constituted by a screw carried by the weft-hammer and arranged to engage by its front end with the said tail-portion in the forward stroke of the weft-hammer. Every time the weft-hammer goes forward, the said end of the screw acts against the said tail-portion, and thereby rocks the resetter or replacer so as to cause its acting portion 17$^a$ to pass upward through slot 17$^b$. If the ball should be over the top of acting portion 17$^a$ as the latter rises, that is to say, if the ball should be in either of the pockets 15$^a$, 15$^b$, or in the rear end of groove 16$^b$, as acting portion 17$^a$ of the resetter or replacer rises, the top of said portion will lift the ball, as aforesaid.

To produce the required transverse movement of the ball across the pockets and grooves to starting position, the top of the acting portion 17$^a$ of the resetter or replacer is made inclined, its highest point being at groove 16$^b$ and its lowest point being adjacent pocket 15. In other words, the upturned end of the resetter or replacer is highest at groove 16$^b$ and lowest at groove 16. Consequently, as the ball is lifted it rolls along the inclined edge of the resetter or replacer to its normal or starting position. To provide for adjustment of the stroke of the resetter or replacer, so as to enable it to be given the required upper limit, the screw 20 is fitted within a threaded hole that is tapped in the weft-hammer 12, and is furnished with a lock-nut 20$^a$.

Although the resetter or replacer is actuated by the weft-hammer at every forward stroke of the lay it can engage with the ball only when the weft-fork slide is in its normal rearward position, because the forward movement of the weft-fork slide carries the ball forward with relation to the acting portion of the resetter or replacer, and consequently when the weft-fork slide is forward the ball also is forward and the resetter or replacer rises behind the ball without engaging with the latter. When the weft-hammer hook engages with the tail of the weft-fork and advances the latter the "lead" in the case of the forward movement of the slide, over the engagement of the screw 20 with the tail of the resetter or replacer, is such that the ball is carried forward away from over the acting portion of the resetter or replacer before such acting portion rises out of the slot 17$^b$. When, however, the weft-fork slide, after one or more counting operations resulting from failure of weft to tilt the weft-fork, remains in its normal rearward position as the weft-hammer makes its forward stroke, as will happen after weft-replenishment has taken place and a pick of the fresh weft is caused to tilt the weft-fork, the working stroke of the resetter or replacer derived from that of the weft-hammer will lift the ball and bring about its reinstatement in its starting position. At all times when the weft-fork slide is moved forward it takes the ball with it, away from over the acting portion of the resetter or replacer before the latter rises high enough to engage with the ball and lift it.

In order to prevent any tendency of the ball to roll forward and thereby escape from the working edge of the resetter or replacer as the latter lifts it, the top of the said end is inclined downwardly and rearwardly, as shown. Since the front edge of such end is the higher, it follows that as such edge rises at the front of the lowest portion of the periphery of the ball the latter will tend rearward toward the wall 18 and will remain in contact with such wall as it travels toward its normal or starting position. The top edge may be uniform in width as in Figs. 12 and 13, and some of the other views, or it may be broader adjacent the groove $16^b$ than elsewhere, as shown in Figs. $12^a$, $12^b$ and $13^a$.

The grooves and pockets may be greater or less in number than three according to the results desired to be attained in practice. In some cases it may not be required to use the entire number with which the base or stand is provided. Accordingly, I furnish means for stopping-off those which are not required to be utilized. One construction of stopping-off means consists, as shown in Figs. 2 and 8, of a screw 21 applied to a threaded hole that is tapped in one side of the weft-fork slide 9 in line with the transverse slot therein, and adapted to enter the said slot at the end thereof corresponding with the pocket 15. When it is desired to employ all of the pockets and grooves the screw 21 is completely retracted as shown in Figs. 2 and 8, or may be entirely removed. This permits the ball to enter and occupy normally the pocket 15. In case only two pockets and grooves are required to be used, the screw 21 is turned in until its inner end is located between pockets 15 and $15^a$ and so that the ball may enter and occupy pocket $15^a$ but cannot pass into pocket 15. In this case the indicating or knocking-off arm or lever 5 will be actuated by the second of two immediately succeeding forward movements of the weft-fork slide 9. In case it is desired to suspend the counting action altogether and actuate the arm or lever 5 every time the weft-fork slide 9 is moved forward, the screw 21 will be turned farther inward so that the ball will be retained by the inner end of the screw substantially in line with the groove $16^b$. Or for this last-mentioned purpose the ball may be placed in groove $16^b$ and the resetter or replacer disconnected or its actuating screw 20 removed or made inoperative to actuate the resetter or replacer. The same results may be attained by adjustment of the pin $5^a$ from one groove to another.

A second construction providing for stopping off is shown in Figs. 19 and 20. In the said construction screw-threaded holes $21^a$, $21^b$, are tapped through the top of the weft-fork slide 9 at points intermediate the pockets 15, $15^a$ and $15^b$, and alternating therewith transversely. A screw $21^c$ may be entered into either hole and be caused to project at its inner end down between pockets 15 and $15^a$, as shown, in case it is desired to stop-off pocket 15 and cause the ball to occupy pocket $15^a$ for its starting position, or such screw may be caused to project down between pockets $15^a$, $15^b$, in case it is desired to stop-off the pocket $15^a$ and cause the ball to work in groove $16^b$ alone.

The base or stand 13 is adjustable forward and rearward upon the breast-beam, the adjustment being provided for by means of slots $13^d$, $13^d$, Figs. 2, 6, 11, 16, 17, receiving the stems of the screws $13^e$, $13^e$, which hold the base or stand in place. To enable the pin $5^a$ of the knocking-off arm or lever to be placed in proper relations with the path-groove $15^b$, provision is made for adjustment of the said arm or lever lengthwise. Thus an eccentric washer or bushing $5^d$, Figs. 3 and 4, is mounted upon the stem of the pivot-pin 6, and the outer end of the knocking-off arm or lever is formed with an eye which fits the exterior of such eccentric washer or bushing. The eccentric bushing is clamped in place between the top surface of bracket 3 and the under-side of the flanged head of the pivot-pin, the stem of the said pivot-pin having upon its screw-threaded lower portion a nut $6^d$ which bears against the under side of the bracket. The flange of the head of the pivot pin also extends over a portion of the knocking-off arm or lever adjacent its eye, but since the washer or bushing is thicker than the said portion of the arm or lever such overhanging portion merely keeps the arm or lever from rising off the pivot, without interfering with swinging movement of the same. To enable the knocking-off arm or lever 5 to be adjusted so as to coöperate properly with the shipper-handle 4 in all positions of adjustment of base or stand 13 and of eccentric washer or bushing $5^d$, the pivot 6 is made adjustable forward and rearward within a slot $6^e$, Figs. 2 and 4, in the outer portion of bracket 3. The said pivot is secured in the desired position of adjustment by means of the nut $6^d$ upon its threaded stem below the said bracket.

The weft-fork slide 9 is shown furnished with a forward extension having an upturned hooked end, such end being in engagement with the downturned upper end of an arm 8 fixed upon a transversely extending rod or shaft 7 mounted in bearings at $7^a$ upon the front of a loom-frame. The said rod or shaft 7, which in practice extends to the opposite end of the loom, is the usual rod or rockshaft which in an automatic replenishing loom, controls operatively the automatic weft-replenishing instrumentalities of such loom, and controls also the cloth taking-up devices. As thus shown combined, the weft-fork slide by a forward movement occasioned on detection of weft-absence will rock the rockshaft 7 to call the replenishing instrumentalities into action and in addition arrest the taking-up, such forward movement and the succeeding return rearward movement serving as a counting or switching movement to transfer the ball 14 from pocket 15 to pocket 15$^a$. If the weft is properly laid in the shed by the first pick following replenishment the slide 9 will remain at rest, the resetter or replacer will operate to return the ball to its normal or starting position, and the regular operation of the loom will proceed. If however the weft should not be properly laid in the shed at such time a second forward movement of the weft-fork slide 9 will take place, resulting in again rocking the rockshaft 7 with the same action as before respecting the replenishing instrumentalities and the take-up devices, and such forward movement and the succeeding rearward return will operate as a second counting or switching movement and transfer the ball from pocket 15$^a$ to pocket 15$^b$. In case the weft should be laid properly in the shed on the first pick following the second replenishment, the slide 9 will remain at rest and the resetter or replacer will operate to return the ball to its normal or starting position and the regular operation of the loom will proceed. If, however, the weft should not thus be laid, a third forward movement of the slide 9 will take place, and by this forward movement, thereof although the rockshaft 7 will be rocked as before, the ball 14 will be caused to actuate the knocking-off arm or lever 5 and thus bring about the arrest of the loom. As thus employed and operating, my deferred-action indicating devices serve as a three-try motion to arrest the loom upon the third of three detections of weft-absence occurring in immediate succession.

One use of my deferred-action indicating devices for pick-finding purposes is as retarding means to delay the operation of the replenishing instrumentalities for a predetermined number of picks after filling-failure, to bring about the introduction of fresh weft or filling into the same shed of the cycle of shed-forming operations in which weft-failure was detected.

I claim as my invention:

1. Deferred-action indicating devices having a traveling actuator or dog, combined with guiding means relative to which the said actuator or dog is movable bodily, said guiding means having a plurality of pathways by which the said actuator or dog is conducted by one or more stages from its starting position into a path in which it produces the prearranged indicating action.

2. Deferred-action indicating devices having a traveling actuator or dog, combined with guiding means relative to which the said actuator or dog is movable bodily, said guiding means having a plurality of pathways by which the said actuator or dog is conducted by one or more stages from its starting position into a path in which it produces the prearranged indicating action, and means for automatically restoring it to the said starting position.

3. Deferred-action indicating devices having a loose or floating actuator or dog, combined with guiding means relative to which the said actuator or dog is movable bodily, said guiding means having a plurality of pathways by which the said actuator or dog is conducted by one or more stages from its starting position into a path in which it produces the prearranged indicating action.

4. Deferred-action indicating devices having a loose or floating actuator or dog, combined with guiding means relative to which the said actuator or dog is movable bodily, said guiding means having a plurality of pathways by which the said actuator or dog is conducted by one or more stages from its starting position into a path in which it produces the prearranged indicating action, and means for automatically restoring it to the said starting position.

5. Deferred-action indicating devices having a reciprocable actuator or dog, and also having guiding means relative to which the said actuator or dog is movable bodily, said guiding means having a plurality of pathways by which said actuator or dog is guided as it moves, and provisions for switching it into one or more different paths at successive strokes made by it, in one of which it effects the predetermined indicating action.

6. Deferred-action indicating devices having a reciprocable actuator or dog, and also having guiding means relative to which the said actuator or dog is movable bodily, said guiding means having a plurality of pathways by which said actuator or dog is guided as it moves, provisions for switching it into one or more different paths at successive strokes made by it, in one of which it effects the predetermined indicating action and means for automatically restoring it to the starting position.

7. Deferred-action indicating devices having a loose or floating reciprocable actuator or dog, and also having guiding means relative to which the said actuator or dog is movable bodily, said guiding means having a plurality of pathways by which said actuator or dog is guided as it moves, and provisions for switching it into one or more different paths at successive strokes made by it, in one of which it effects the predetermined indicating action.

8. Deferred-action indicating devices having a loose or floating reciprocable actuator or dog, and also having guiding means relative to which the said actuator or dog is movable bodily, said guiding means having a plurality of pathways by which said actuator or dog is guided as it moves, and provisions for switching it into one or more different paths at successive strokes made by it, in one of which it effects the predetermined indicating action, and means for automatically restoring it to the starting position.

9. Deferred-action indicating devices having a reciprocable actuator or dog, and also having a plurality of path-grooves governing the said actuator or dog in the movements of the latter, and provisions for switching the actuator or dog by one or more successive stages into a path of movement in which it effects the predetermined indicating action.

10. Deferred-action indicating devices having a reciprocable actuator or dog, and also having a plurality of path-grooves governing the said actuator or dog in the movements of the latter, and provisions for switching the actuator or dog by one or more successive stages into a path of movement in which by its stroke it effects the predetermined indicating action.

11. Deferred-action indicating devices having an actuator or dog, and also having a plurality of path-grooves governing the said actuator or dog in the relative reciprocations of the parts, and provisions by which the actuator or dog is switched by one or more successive stages into a position in which by its stroke it effects the predetermined indicating action.

12. Deferred-action indicating devices having an actuator or dog, and also having a plurality of path-grooves governing the said actuator or dog in the relative reciprocations of the parts, provisions by which the actuator or dog is switched by one or more successive stages into a position in which it effects the predetermined indicating action, and means for restoring it automatically to the starting position.

13. Deferred-action indicating devices having a traveling actuator or dog, combined with guiding means by which the said actuator or dog is conducted by one or more stages from its starting position and primary path into a path in which it produces the prearranged indicating action, and means for varying at will the number of such stages.

14. Deferred-action indicating devices having a traveling actuator or dog, combined with guiding means by which the said actuator or dog is conducted by stages from its starting position and primary path into a path in which it produces the prearranged indicating action, means for varying at will the number of such stages, and means for restoring the said actuator or dog automatically to the said starting position.

15. Indicating devices for looms, comprising in combination with weft-detector devices, a traveling actuator or dog actuated by the movement of one of the elements of said devices when the predetermined condition of the weft is detected, guiding means relative to which the said actuator or dog is movable bodily, said guiding means having a plurality of pathways for the said actuator or dog, and means for switching the said actuator or dog by one or more stages into a path in which it produces the prearranged indicating action.

16. Indicating devices for looms, comprising in combination with weft-detector devices a loose or floating actuator or dog actuated by the movement of one of the elements of said devices when the predetermined condition of the weft is detected, guiding means for the said actuator or dog, and means relative to which the said actuator or dog is movable bodily, said guiding means having a plurality of pathways for switching the said actuator or dog by one or more stages into a path in which it produces the prearranged indicating action.

17. Indicating devices for looms, comprising in combination with weft-detector devices a reciprocable actuator or dog actuated by the said devices when the predetermined condition of the weft is detected, guiding means relative to which the said actuator or dog is movable bodily, said guiding means having a plurality of pathways by which said actuator or dog is guided as it moves, and provisions for switching it into a different path or paths at successive strokes made by it in one of which it effects the predetermined indicating action.

18. Indicating devices for looms, comprising in combination with weft-detector devices a traveling actuator or dog actuated by the movement of one of the elements of said devices when the predetermined condition of the weft is detected, guiding means relative to which the said actuator or dog is movable bodily, said guiding means having a plurality of pathways for the said actuator or dog and means for switching the said actuator or dog by one or more stages into a path in which it produces the prearranged indicating action, and means for automatically restoring said actuator or dog to the starting position.

19. Indicating devices for looms, comprising in combination with weft-detector devices a loose or floating actuator or dog actuated by the movement of one of the elements of said devices when the predetermined condition of the weft is detected, guiding means relative to which the said actuator or dog is movable bodily, said guiding means having a plurality of pathways for the said actuator or dog and means for switching the said actuator or dog by one or more stages into a path in which it produces the prearranged indicating action and means for automatically restoring said actuator or dog to the starting position.

20. Indicating devices for looms, comprising in combination with weft-detector devices a reciprocable actuator or dog actuated by the said devices when the predetermined condition of the weft is detected, guiding means relative to which the said actuator or dog is movable bodily, said guiding means having a plurality of pathways by which said actuator or dog is guided as it moves, and provisions for switching it into one or more different paths at successive strokes made by it in one of which it effects the predetermined indicating action, and means for automatically restoring said actuator or dog to the starting position.

21. Indicating devices for looms comprising in combination with the weft-fork slide a transversely movable actuator or dog accompanying the said slide in its forward and rearward movements, a base or stand having a plurality of paths by which the said actuator or dog is guided as it accompanies the slide, and provisions for switching the actuator or dog into different paths at successive strokes made by it in one of which it effects the predetermined indicating action.

22. Indicating devices for looms comprising in combination with the weft-fork slide a transversely movable actuator or dog accompanying the said slide in its forward and rearward movements, a base or stand having a plurality of paths by which the said actuator or dog is guided as it accompanies the slide, and provisions for switching the actuator or dog into different paths at successive strokes made by it in one of which it effects the predetermined indicating action, and means for automatically restoring the actuator or dog to the starting position.

23. Indicating devices for looms comprising in combination with the weft-fork slide a transversely movable actuator or dog accompanying the said slide in its forward and rearward movements, a base or stand having a plurality of paths by which the said actuator or dog is guided as it accompanies the slide, and provisions for switching the actuator or dog into different paths at successive strokes made by it in one of which it effects the predetermined indicating action, means for selectively varying the primary path of movement to thereby vary at will the count.

24. Indicating devices having a traveling actuator or dog, and also having guiding means by which said actuator or dog is guided as it moves, provisions for switching it from its primary path in one or more secondary paths at successive strokes made by it, in one of which it effects the predetermined indicating action, and means for selectively varying the primary path to thereby vary at will the count.

25. Indicating devices having a traveling actuator or dog, and also having guiding means with a plurality of paths in which successively said actuator or dog is guided as it makes successive strokes, provisions for switching it from its primary path into one or more secondary paths at successive strokes made by it, in one of which it effects the predetermined indicating action, and means for selectively varying the primary path to thereby vary at will the count.

26. Indicating devices having a traveling actuator or dog, and also having a plurality of paths for said actuator or dog in one of which it produces the prearranged indicating action, provisions for switching the actuator or dog from one path to another at successive strokes made by it, and means for selectively varying the primary path to thereby vary at will the count preceding the indicating action.

27. Deferred - action indicating devices having a rolling actuator or dog, combined with guiding means by which the said actuator or dog is conducted by one or more stages from its starting position into a path in which it produces a prearranged indicating action.

28. Deferred - action indicating devices having a rolling actuator or dog, combined with guiding means by which the said rolling actuator or dog is conducted by one or more stages from its starting position into a path in which it produces a prearranged indicating action, and means for automatically restoring it to the said starting position.

29. Deferred - action indicating devices having a rolling actuator or dog, combined with guiding means by which the said rolling actuator or dog is conducted by stages from its starting position and primary path into a path in which it produces a prearranged indicating action, and means for varying at will the number of such stages.

30. Deferred - action indicating devices having a rolling actuator or dog, combined with guiding means by which the said rolling actuator or dog is conducted by stages from its starting position and primary path into a path in which it produces a prearranged indicating action, means for varying at will the number of such stages, and means for restoring said actuator or dog automatically to the said starting position.

31. Indicating devices for looms, comprising in combination with weft-detector devices, a rolling actuator or dog actuated by the movement of one of the elements of said devices when the predetermined condition of the weft is detected, guiding means for the said rolling actuator or dog, and means for switching the said rolling actuator or dog by one or more stages into a path in which it produces the prearranged indicating action.

32. Indicating devices for looms, comprising in combination with weft-detector devices, a rolling actuator or dog actuated by the movement of one of the elements of said devices when the predetermined condition of the weft is detected, guiding means for the said rolling actuator or dog, means for switching the said actuator or dog by one or more stages into a path in which it produces the prearranged indicating action, and means for automatically restoring the rolling actuator or dog to the starting position.

33. Deferred-action indicating devices having a traveling actuator or dog, combined with guiding means by which the said actuator or dog is conducted by one or more stages transversely from its starting position into a path in which it produces a prearranged indicating action.

34. Deferred-action indicating devices having a traveling actuator or dog, combined with guiding means by which the said actuator or dog is conducted by one or more stages transversely from its starting position into a path in which it produces a prearranged indicating action, and means for automatically restoring it to the said starting position.

35. Deferred-action indicating devices having a traveling actuator or dog, combined with guiding means by which the said actuator or dog is conducted by one or more stages transversely from its starting position into a path in which it produces a prearranged indicating action, and means for varying at will the number of such stages.

36. Deferred-action indicating devices having a traveling actuator or dog combined with guiding means by which the said actuator or dog is conducted by stages transversely from its starting position into a path in which it produces a prearranged indicating action, means for varying at will the number of such stages, and means for restoring said actuator or dog automatically to the said starting position.

37. Indicating devices for looms, comprising in combination with weft-detector devices, a traveling actuator or dog actuated by the movement of one of the elements of said devices when a predetermined condition of the weft is detected, guiding means for the said traveling actuator or dog, and means for switching the said actuator or dog transversely by one or more stages into a path in which it produces a prearranged indicating action.

38. Indicating devices for looms, comprising in combination with weft-detector devices, a traveling actuator or dog actuated by the movement of one of the elements of said devices when a predetermined condition of the weft is detected, guiding means for the said actuator or dog, means for switching the said actuator or dog transversely by one or more stages into a path in which it produces a prearranged indicating action, and means for automatically restoring the traveling actuator or dog to the starting position.

In testimony whereof I affix my signature in presence of two witnesses.

HENRY A. OWEN.

Witnesses:
E. KENT SWIFT,
ABBA S. NOYES.

It is hereby certified that in Letters Patent No. 1,240,592, granted September 18, 1917, upon the application of Henry A. Owen, of Whitinsville, Massachusetts, for an improvement in "Deferred-Action Indicating Devices for Looms," errors appear in the printed specification requiring correction as follows: Page 7, line 88, claim 16, after the word "means" insert the clause *relative to which the said actuator or dog is movable bodily, said guiding means having a plurality of pathways;* same page and claim, line 89, commencing with the word "relative" strike out all to and through the word "pathways," line 91; and that the said Letters Patent should be read with these corrections therein that the same may conform to the record of the case in the Patent Office.

Signed and sealed this 22d day of April, A. D., 1919.

[SEAL.]

F. W. H. CLAY,

Cl. 139—85.

*Acting Commissioner of Patents.*